US007438263B2

(12) United States Patent
Rassaian et al.

(10) Patent No.: US 7,438,263 B2
(45) Date of Patent: Oct. 21, 2008

(54) OPTIMAL AIRCRAFT WINDOW SHAPE FOR NOISE CONTROL

(75) Inventors: Mostafa Rassaian, Bellevue, WA (US); Jung-Chuan Lee, Federal Way, WA (US); Josh Montgomery, Seattle, WA (US); Peter S. Guard, Sammamish, WA (US); Mark A. Stadum, Marysville, WA (US); Paul E. Mikulencak, Snohomish, WA (US); Richard W. Brigman, Everett, WA (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 11/223,297

(22) Filed: Sep. 9, 2005

(65) Prior Publication Data
US 2007/0069079 A1 Mar. 29, 2007

(51) Int. Cl.
*B64C 1/14* (2006.01)
(52) U.S. Cl. .................. 244/129.3; 244/118.5; 244/121; 381/71.4
(58) Field of Classification Search .............. 244/129.3, 244/118.5, 121, 119; 52/171.1; 381/71.4
See application file for complete search history.

(56) References Cited
U.S. PATENT DOCUMENTS

| | | | | | |
|---|---|---|---|---|---|
| 2,473,616 | A | * | 6/1949 | Stephenson | 244/129.3 |
| 3,192,575 | A | * | 7/1965 | Rosenau, Jr. et al. | 52/171.1 |
| 3,429,530 | A | * | 2/1969 | Heinrich | 244/129.3 |
| 4,669,410 | A | * | 6/1987 | Howell | 114/173 |
| 5,156,383 | A | * | 10/1992 | Williams | 269/293 |
| 5,884,865 | A | * | 3/1999 | Scherer et al. | 244/129.3 |
| 6,082,674 | A | * | 7/2000 | White et al. | 244/129.3 |
| 6,736,352 | B2 | * | 5/2004 | Bladt et al. | 244/129.3 |
| 7,028,950 | B2 | * | 4/2006 | Salmon et al. | 244/129.3 |
| 7,118,069 | B2 | * | 10/2006 | Novak et al. | 244/119 |
| 7,281,686 | B2 | * | 10/2007 | Wood | 244/129.3 |
| 2001/0015398 | A1 | * | 8/2001 | Lau et al. | 244/129.3 |

* cited by examiner

Primary Examiner—Michael J. Carone
Assistant Examiner—Benjamin P Lee
(74) Attorney, Agent, or Firm—Don C. Lawrence; MacPherson Kwok Chen & Heid LLP

(57) ABSTRACT

A window for a subsonic passenger aircraft that provide maximum optical visibility while minimizing the amount of exterior acoustic noise transmitted through the windows to the passenger cabin during flight of the aircraft includes at least one substantially transparent window pane having the shape of an ellipse. The ellipse has a major axis and a minor axis, and the major axis is about twice as long as the minor axis and is disposed generally perpendicular to the direction of flight of the aircraft. In one exemplary embodiment, the window has a height of about 20 inches and a transparent area of about 141 square inches, and includes a pair of substantially similar window panes disposed in a parallel, spaced-apart relationship circumscribed by a mounting bezel. A plurality of the windows are each mounted with the bezels in spaced-apart rows in each of the opposite sidewalls of the aircraft fuselage.

20 Claims, 4 Drawing Sheets

OPTIMAL AIRCRAFT WINDOW SHAPE FOR NOISE CONTROL

TECHNICAL FIELD

This invention pertains to aircraft design in general, and in particular, to a shape for the windows of a subsonic passenger aircraft that is optimized to provide maximum passenger exterior visibility while minimizing the amount of acoustic noise transmitted through the windows to the interior of the aircraft during flight.

BACKGROUND

The current market for modern passenger aircraft intended for use in commercial aviation is highly competitive and necessitates that strict attention be paid to certain industry specific design requirements, such as passenger comfort. For example, passenger planes are being designed for "Best-In-Class" passenger comfort, and this includes cabin noise level goals that are as low as or lower than any current large commercial aviation aircraft.

In such aircraft, the airplane fuselage sidewalls in general, and the passenger windows in particular, are the dominant paths of external noise entry. This is of primary concern on modern passenger planes having larger passenger windows and composite fuselages, both of which may transmit external noise. The predominant sources of noise that transmit through the "window belt," i.e., the rectangular areas on opposite sides of the aircraft's fuselage that include the laterally facing passenger windows, and may number as many as 52 windows per side, include turbulent aerodynamic flow along the fuselage, as well as noise originating in the exhaust plume of the aircraft's engines. Both sources have large low-frequency components that are difficult to reduce without adding significant weight to the structure. As weight is an additional critical consideration for the performance of the airplane, any weight-reduction concepts are necessarily of very high value. Thus, a window design that reduces the area of fuselage skin in the window belt above and below the window transparencies is highly desirable. Besides weight limitations, the need to use optically transparent materials in the windows further complicates window noise control efforts.

Thus, an important need exists in the aviation industry for a window design for a subsonic passenger aircraft that is optimized to provide maximum passenger exterior visibility while minimizing the amount of acoustic noise transmitted through the windows to the interior of the aircraft during flight.

SUMMARY OF THE INVENTION

In accordance with the various exemplary embodiments thereof described herein, a shape for the windows of a subsonic passenger aircraft is provided that is optimized to maximize passenger visibility while minimizing the amount of acoustic noise transmitted through the windows to the interior of the aircraft during flight.

In one exemplary embodiment thereof, the novel aircraft window comprises at least one substantially transparent window pane having the shape of an ellipse having a major axis and a minor axis. The major axis has a length about twice the length of the minor axis and is disposed generally perpendicular to the aircraft's direction of flight, i.e., to the long axis of the aircraft's fuselage. In a preferred exemplary embodiment, the ellipse of the window has an eccentricity of at least 0.87, and the optically transparent area window has an area of at least 140 square inches.

In another exemplary embodiment, the aircraft window can comprise a pair of substantially similar, elliptically shaped panes, e.g., an inboard pane and an outboard pane, each having a major axis about 20 inches long and a minor axis about 8 inches long, disposed in a parallel, spaced-apart relationship defining a space, or volume, therebetween. A correspondingly shaped bezel that circumscribes the inboard and outboard panes can be used to close the volume between the panes and sealingly couple the edges of the panes to the fuselage of the aircraft. In one advantageous alternative embodiment, the volume between the panes can be evacuated to lower the pressure in the volume to be substantially less than the ambient pressure surrounding the window.

In an exemplary application of the novel windows, the aircraft can comprise a subsonic passenger plane having an elongated fuselage with opposite sidewalls and longerons, and the structure of the aircraft can generally incorporate substantial amounts of composite materials. The elliptical windows are preferably arranged in a spaced row mounted in each of the opposite sidewalls of the fuselage, with the windows of each row being spaced apart longitudinally by about 25 in., and with the long, or major axis, of the window being disposed generally perpendicular to a longeron, or the long axis, of the fuselage.

A better understanding of the above and many other features and advantages of the noise-reducing aircraft windows of the invention may be obtained from a consideration of the detailed description below of some exemplary embodiments thereof, particularly if such consideration is made in conjunction with the appended drawings, wherein like reference numerals are used to identify like elements illustrated in one or more of the figures therein.

DETAILED DESCRIPTION

The technical problem addressed by this invention is the provision of a subsonic airliner passenger window shape that reduces the vibration levels of and the noise transmitted through a "window belt," i.e., a section of the sidewalls of the aircraft's fuselage that includes the windows, that employs composite materials in its structure and a relatively large transparent window area. The problem evaluated involved the excitation of a section of the surface of the aircraft's fuselage including the above window belt by a turbulent boundary layer ("TBL"), and the results obtained were based on the structural response of the window belt to such an excitation.

Figure 1:
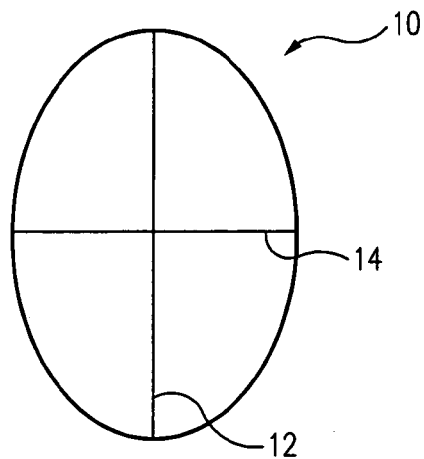
FIG. 1 is an outline view of the shape and vertical orientation of a prior art window of a passenger aircraft.

The basic window shape selected for evaluation was that of an ellipse, because it was considered that such a window shape would best satisfy two competing design considerations, viz., a minimization or complete avoidance of any sharp corners or radii in the window that could act as stress raisers affecting the structural integrity of the aircraft, and the maximization of the ratio of window transparent area to the amount of acoustic noise transmitted through the window to the interior of the aircraft during flight, using a known window configuration and noise transmissivity, viz., that of a prior art aircraft, as illustrated in FIG. 1, as a baseline for comparison. As outlined in FIG. 1, the baseline window 10 comprises two substantially transparent window panes disposed in a parallel, spaced-apart relationship that are each shaped as an ellipse having an eccentricity of about 0.67, a major axis 12 of about 15.32 inches, a minor axis 14 of about 11.30 inches, and a transparent area of about 147 square inches.

Figure 2:
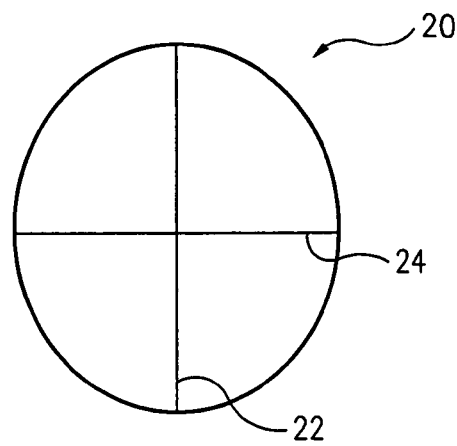
FIG. 2 is an outline view of the shape and vertical orientation of a first proposed noise-reducing window for a passenger aircraft.
Figure 3:
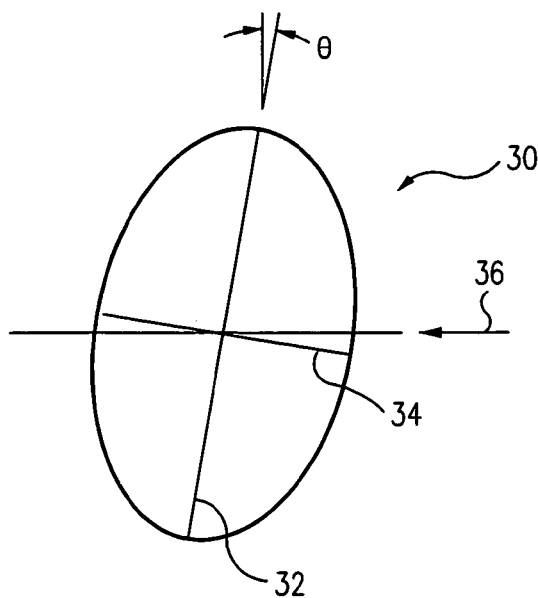
FIG. 3 is an outline view of the shape and vertical orientation of a second proposed noise-reducing window for a passenger aircraft.

Three basic passenger window shapes were proposed for evaluation and comparison with the baseline window 10 shape:

1. A relatively short and squat elliptical window 20 (the "ellipse") having a relatively small eccentricity of about 0.35, a major axis 22 with a length of about 14.19 inches, a minor axis 24 having a length of about 13.28 inches, a transparent area of about 160 square inches, and wherein the major axis of the ellipse was oriented generally perpendicular to the aircraft's line of flight, as illustrated in FIG. 2;

2. A relatively tall, narrow window 30 (the "slanted") having an eccentricity of about 0.74, a major axis 32 about 16.43 inches long, a minor axis 34 having a length of about 11.03 inches, and a transparent area of about 148 square inches, and wherein the major axis 32 of the window was canted forward relative to the aircraft's line of flight 36 by an angle Θ of about 11.5 degrees, as illustrated in FIG. 3; and, 3. A relatively tall, narrow window 40 (codenamed the "harmony") having a relatively large eccentricity of about 0.91, a major axis 42 having a length of about 20.13 inches, a minor axis 44 having a length of about 8.24 inches, and a transparent area of about 141 square inches, and wherein the major axis 42 of the window was disposed generally perpendicular to the aircraft's direction of flight, i.e., to a longeron of the aircraft's fuselage.

The analysis of the above three window shapes 20, 30 and 40 was performed using a Finite Element Method ("FEM") technique, which was predominantly concerned with a frequency range of up to about 1250 Hz. The focus was on the design of the primary structure, and the details of the payloads and/or interiors items were not modeled explicitly, as it was assumed that these would affect all three of the window designs considered in a substantially similar manner. Additionally, the effects of window insulation and trim systems were modeled in terms of their mass and damping characteristics.

In the analysis, focus was directed onto two distinct areas of the structure, viz., the transparent portion of the windows themselves, and the aircraft skin within a "window belt" surrounding the windows. This was done because the transparent portion of the window, i.e., the one or more transparent panes thereof, is the more difficult to treat acoustically, while the modes of the skin pocket above and below the transparency appear to drive the low-frequency acoustic response of the prior art sidewall.

FIGS. 5-8 respectively illustrate an exploded perspective view of the FEM models, or elemental "meshes" 50, 60, 70 and 80 of the "window belts," i.e., the sections of the sidewall of an exemplary passenger aircraft fuselage, each respectively incorporating three of the respective window shapes 10, 20, 30 and 40 of FIGS. 1, 2, 3 and 4, which were used to compute the TBL noise transmitted through the section to the interior cabin of the aircraft during flight of the aircraft. Each window belt model included the structural elements of a respective fuselage skin 52, 62, 72 and 82, stringers or longerons 54, 64, 74 and 84, former rings 56, 66, 76 and 86, and window bezels 58, 68, 78 and 88 circumscribing the panes of the windows and sealingly coupling them to the aircraft's fuselage structure in a known manner. Each mesh analyzed thus comprised an annular segment of the sidewall of the fuselage about 70 inches long, about 48 inches high, each containing 3 window "bays," and a total of 17,500 shell elements. A symmetric boundary condition in a cylindrical coordinate system was applied at top and bottom edges. The fore and aft boundaries of the meshes were constrained in the x-translation axis, i.e., the direction of flight of the aircraft, and in all three axes of rotation, Θx, Θy, and Θz. These boundary conditions were chosen as best representing the effects of the surrounding fuselage structure.

Each window belt was then subjected to a baseline TBL source, based on previously measured TBL levels for the baseline aircraft. In addition to the TBL acoustic pressure applied from the outside skin of the fuselage, each window belt was also subjected to a 8.5 psi per-load pressure from the inside skin of the fuselage, to represent internal pressurization of the cabin at altitude. The modal damping assumed in the analysis was based on data obtained from a fully trimmed prior art sidewall section previously tested in an interior noise test facility.

Because the response of the respective structures varied significantly from point to point, it was felt to be useful to focus on spatial averages. Thus, to efficiently evaluate the design of the respective window shapes 10, 20, 30 and 40 for noise transmissivity, three zones were used. FIGS. 5-8 respectively illustrate the zones for which spatial averages were computed, viz., 1) the panes themselves of the respective windows 10, 20, 30, and 40, the center bay skin 59, 69, 79 and 89, and respective ones of the entire sections 50, 60, 70 and 80. Another averaging technique commonly used in noise analysis, viz., frequency band averaging, was also employed. In particular, the results were averaged over third-octave bands.

Figure 9:
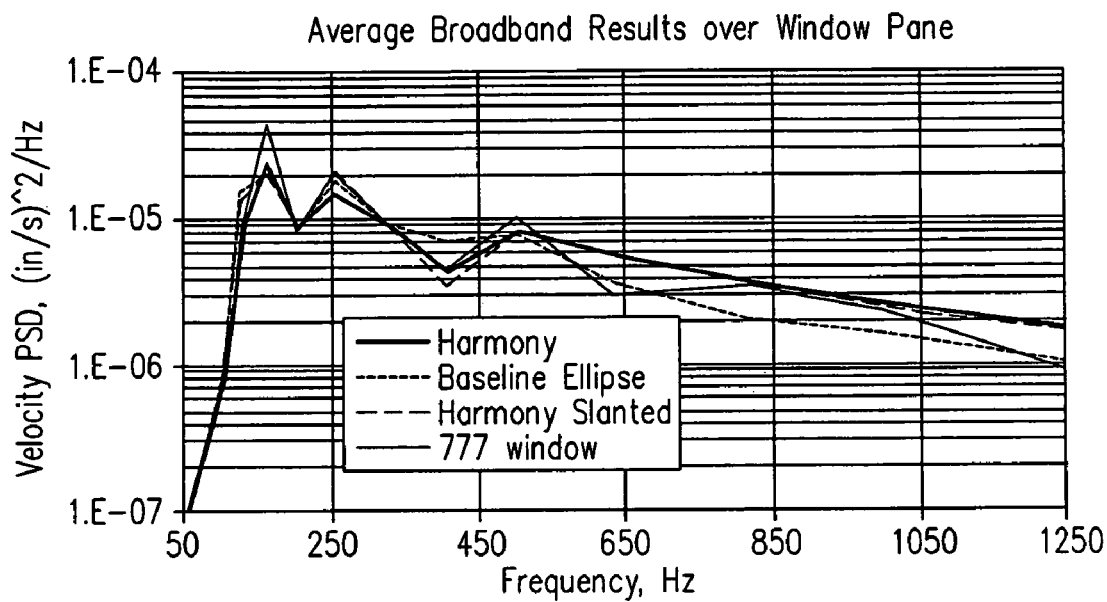
FIG. 9 is a graph of the computed average velocity power spectral density ("PSD") of the external TBL noise transmitted through the respective windows of the respective fuselage sections of FIGS. 5-8 during flight, as a function of frequency; and, FIG. 10 is a graph of the computed average PSD of the external TBL noise transmitted through the mid-bay center skins of the respective fuselage sections of FIGS. 5-8 during flight, as a function of frequency.
Figure 10:
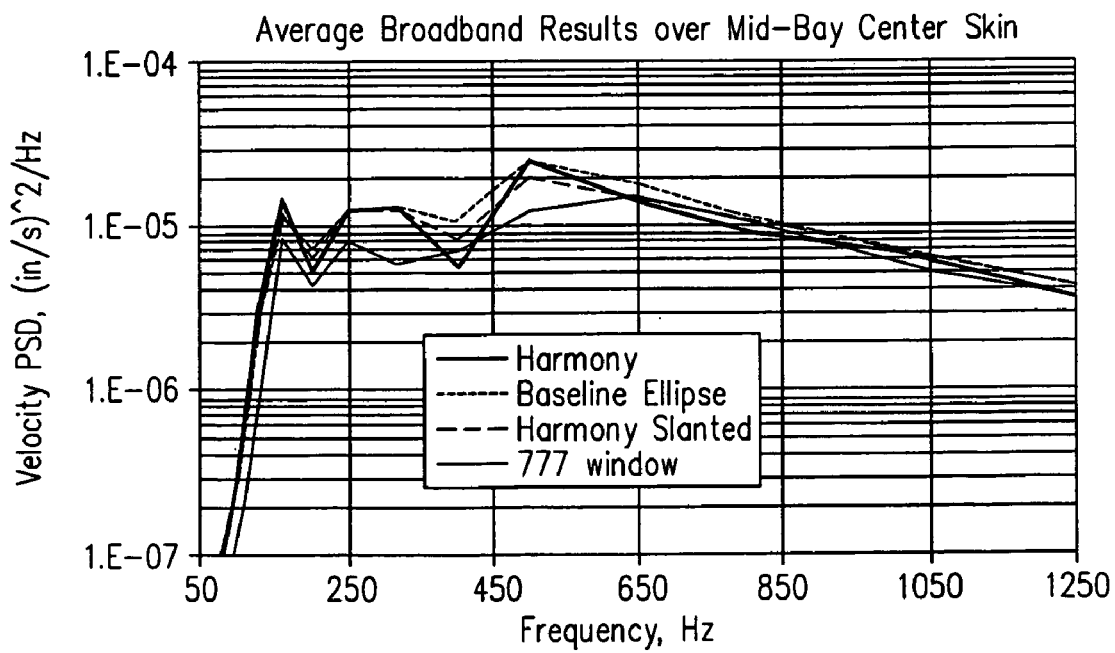

The composite comparisons of the different spatial averages for each of the four window shapes analyzed are illustrated graphically in FIGS. 9 and 10. In particular, FIG. 9 is a graph of the computed average velocity power spectral density ("PSD"), i.e., the power per unit frequency interval, of the external TBL random noise transmitted through the respective window shapes 10, 20, 30 and 40 of the respective three-bay fuselage sections 50, 60, 70 and 80 of FIGS. 5-8 during flight, as a function of frequency, and FIG. 10 is a graph of the computed average PSD of the external TBL noise transmitted through the mid-bay center skins of the respective fuselage sections of FIGS. 5-8 during flight, as a function of frequency. Velocity PSD was chosen as the more relevant parameter for a two reasons: First, for continuity, i.e., the normal velocity of the window pane must be equal to the acoustic velocity. Second, in the simple case of plane waves of constant frequency, the acoustic momentum (i.e., the Euler) equation, yields a direct, linear relationship between velocity and pressure. It is the acoustic pressure that is used to define the cabin sound levels. Power Spectral Density is used because of the random nature of the Turbulent Boundary Layer noise source.

On a basic level, configuring the window shape for reduced noise transmission amounts to an attempt to decouple the TBL source from the fundamental mode of the window. If such decoupling is not possible or practically feasible, the frequency at which the windows couple should be designed to be higher where the material transmission loss is greater. The above study demonstrated that having a tall, narrow, elliptical window having its major axis oriented generally perpendicular to the direction of flight of the airplane enables a relatively large window area to be achieved, while the critical distance (i.e., the width) is smaller than the correlation length scales of the low frequency turbulence. In practice, the study shows that this height-to-width ratio should be about 2-to-1, or greater, or equivalently, that the eccentricity of the ellipse should be about 0.87 or greater.

Another key aspect of the tall, narrow window design is that it reduces the area of fuselage skin above and below the transparency, but still within the window belt. This area of skin is a stronger contributor to low frequency noise than the areas on either side of the window. Thus, reducing the area above and below the windows shifts the skin panel modes to higher frequencies, thereby decoupling the modal behavior between the window and the skin, and reducing overall structural response.

Figure 4:
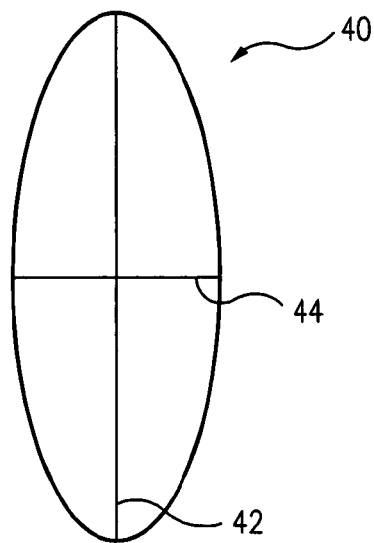
FIG. 4 is an outline view of the shape and vertical orientation of an exemplary embodiment of a noise-reducing aircraft window for a passenger aircraft in accordance with the present invention.
Figure 5:
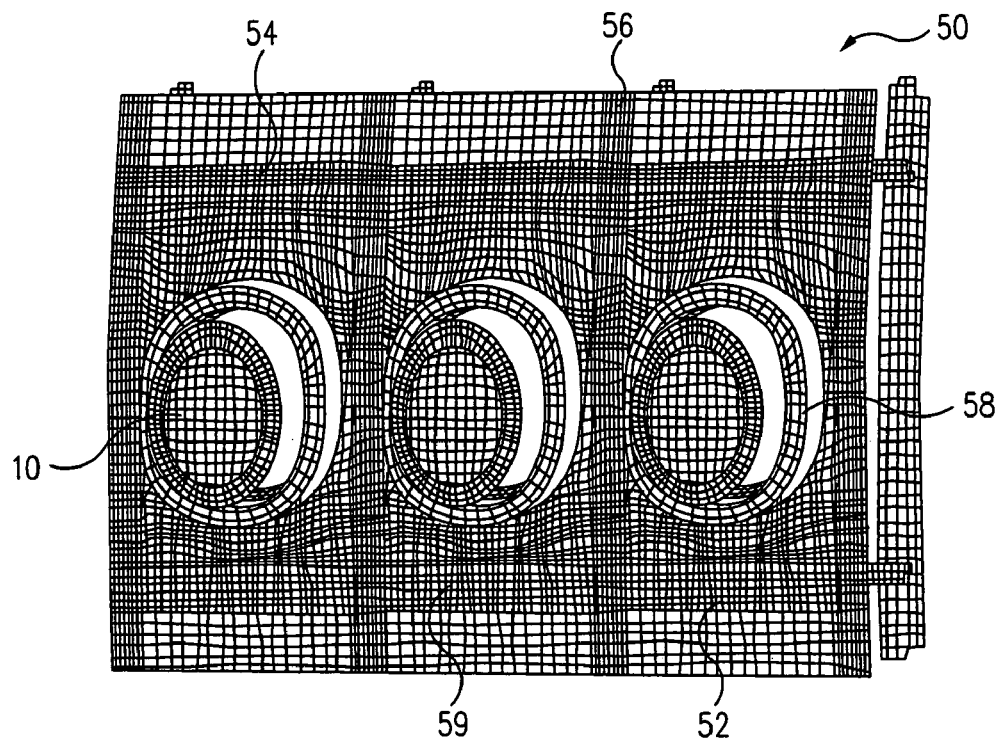
FIG. 5 is an exploded perspective view of a finite element model ("FEM"), or elemental "mesh," of a section of a sidewall of a passenger aircraft fuselage incorporating three of the prior art aircraft windows of FIG. 1, used to compute the total amount of external turbulent boundary layer ("TBL") noise transmitted through the section to the interior cabin of the aircraft during flight.
Figure 6:
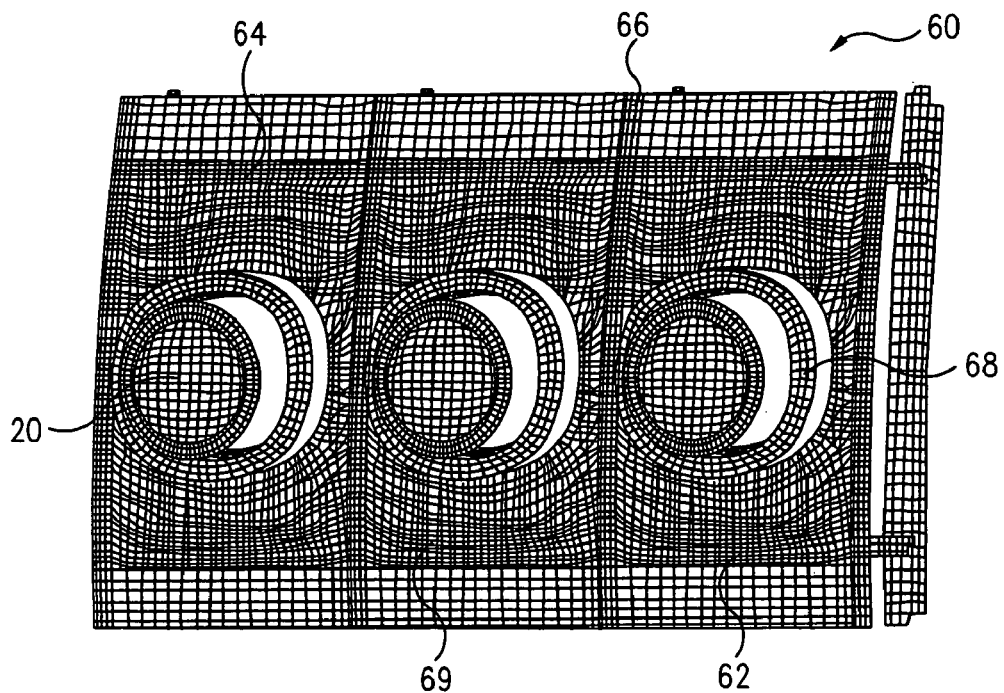
FIG. 6 is an exploded perspective view of a FEM of a fuselage section similar to FIG. 5, except incorporating three of the first proposed noise-reducing windows of FIG. 2, used to compute the amount of external TBL noise transmitted through the section during flight.
Figure 7:
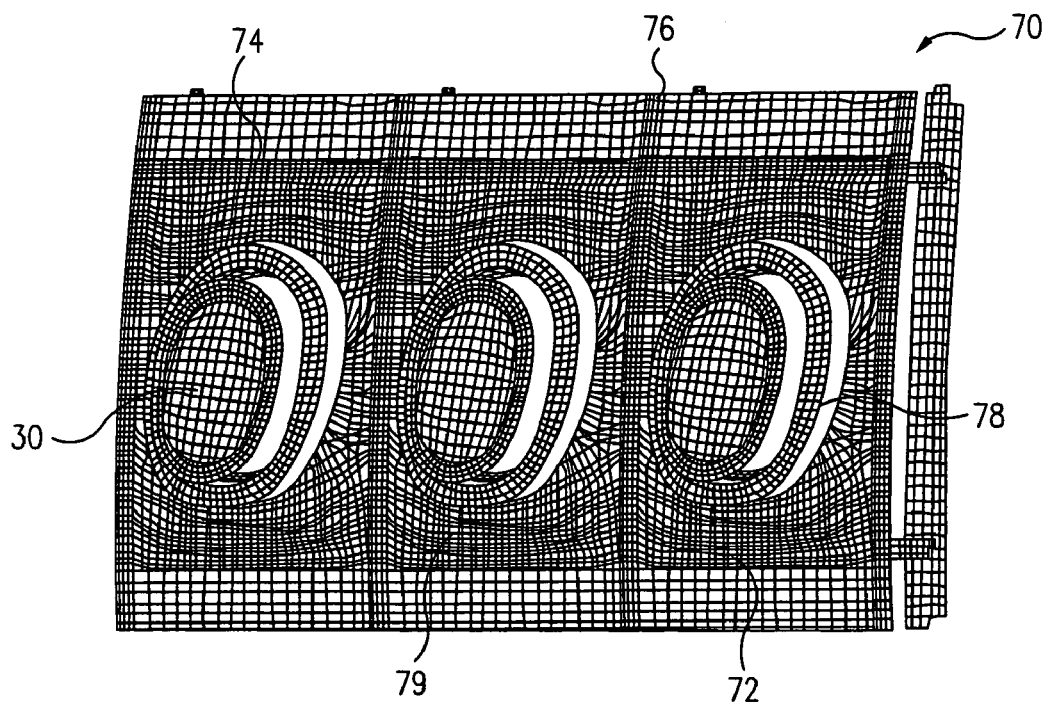
FIG. 7 is an exploded perspective view of a FEM of a fuselage section similar to FIGS. 5 and 6, except incorporating three of the second proposed noise-reducing windows of FIG. 3, used to compute the amount of external TBL noise transmitted through the section during flight.
Figure 8:
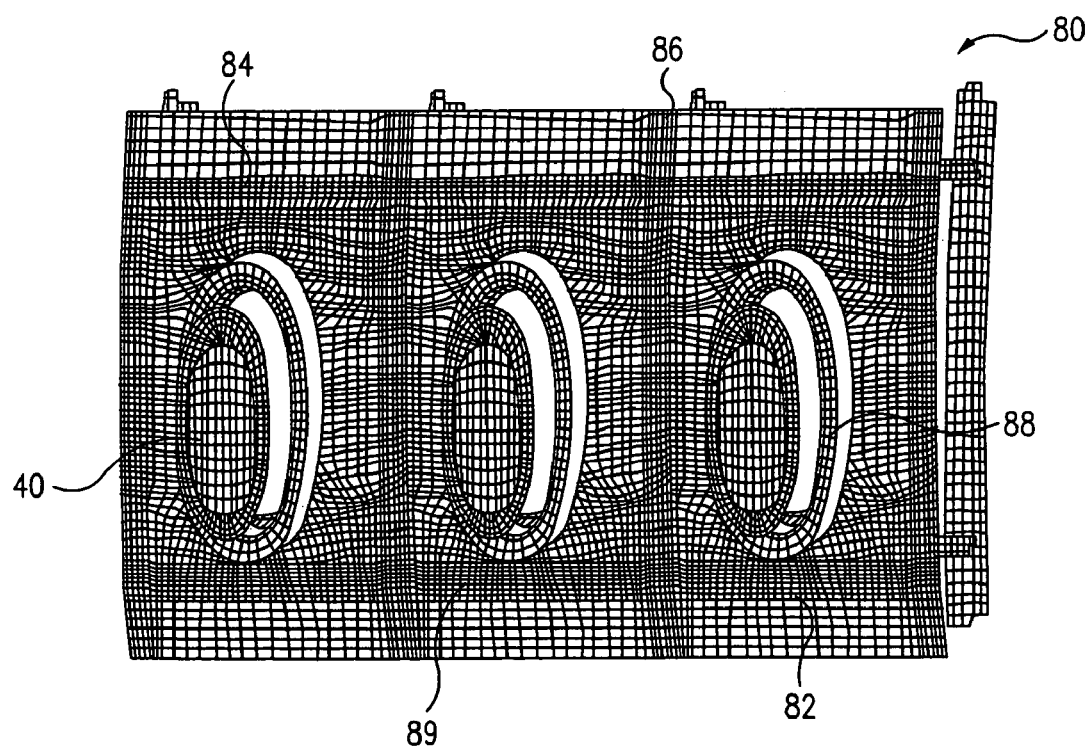
FIG. 8 is an exploded perspective view of a FEM of a fuselage section similar to FIGS. 5-7, except incorporating three of the noise-reducing aircraft windows of the present invention illustrated in FIG. 4, used to compute the amount of external TBL transmitted through the section during flight.

In particular, the results shown in the graphs of FIGS. 9 and 10 demonstrate that the "Harmony" window shape 40 and orientation, as illustrated in FIG. 4, has a slightly higher velocity Power Spectral Density ("PSD") transmissivity in the 160 Hz third-octave-band. This is because the fundamental frequency for the Harmony window is about 145 Hz, which lies within this band. However, looking at the lower frequencies in general (i.e., <500 Hz), the most significant reduction in sound level is seen to be obtained by the Harmony window shape. Further, the surrounding skin response is lowest in this same frequency band. In this regard, it should be noted that the window pane response is not driving the passenger seat noise levels in the higher frequency range above about 500 Hz.

Thus, an exemplary embodiment of an aircraft window 40 in accordance with the present invention comprises at least one substantially transparent window pane with the shape of an ellipse having a major axis 42 and a minor axis 44, as illustrated in FIG. 4. The major axis of the ellipse has a length about twice the length of the minor axis thereof, and is disposed generally perpendicular to the aircraft's direction of flight, i.e., to the long axis of the aircraft's fuselage. In an exemplary embodiment, the ellipse has an eccentricity of about 0.91 or greater, and the optically transparent portion of the window has an area of at least about 140 square inches. The exemplary window can further comprise a pair of substantially similar, elliptically shaped panes, i.e., an inboard pane and an outboard pane, each having a major axis about 20 inches long and a minor axis about 8 inches long, disposed in a parallel, spaced-apart relationship defining a space, or volume, therebetween. A correspondingly shaped bezel 88 (see FIG. 8) that circumscribes the inboard and outboard panes can be used to close the volume between the panes and sealingly couple the edges of the panes to the sidewall of the surrounding fuselage 80 of the aircraft. In another possible alternative embodiment, the volume between the two panes can be evacuated to lower the pressure in the volume to be substantially less than the ambient pressure surrounding the window, and thereby further reduce the noise transmissivity of the window.

In an exemplary application of the novel Harmony windows 40, the aircraft can comprise a subsonic passenger plane having an elongated fuselage with opposite sidewalls and longerons, and the structure of the aircraft can generally incorporate substantial amounts of composite materials. The elliptical windows are preferably arranged in a spaced row mounted in each of the opposite sidewalk of the fuselage, with the windows of each row being spaced apart longitudinally by about 25 in., and with the long, or major axis, of the window being disposed generally perpendicular to a longeron, or the long axis, of the fuselage.

By now, those of skill in this art will appreciate that many modifications, substitutions and variations can be made in and to the materials, apparatus, configurations and methods of the aircraft windows of the present invention without departing from its spirit and scope. Accordingly, the scope of the present invention should not be seen as limited to the particular embodiments illustrated and described herein, as they are merely exemplary in nature, but rather, should be fully commensurate with that of the claims appended hereafter and their functional equivalents.

What is claimed is:

1. An aircraft window providing maximum optical visibility while minimizing the amount of exterior acoustic noise transmitted through the windows to the interior of the aircraft during flight, comprising:

at least one substantially transparent window pane having the shape of an ellipse, the ellipse having a major axis and a minor axis, the major axis being disposed generally perpendicular to a direction of flight of the aircraft, and wherein the ellipse has an eccentricity of about 0.87 or greater.

2. The window of claim 1, wherein the ellipse has an eccentricity of from about 0.87 to about 0.91.

3. The window of claim 1, wherein the window pane has an area of at least about 140 square inches.

4. The window of claim 1, wherein the aircraft comprises a passenger plane, and wherein the at least one pane is disposed in a sidewall of a fuselage of the plane and adjacent to a passenger seat thereof.

5. The window of claim 4, wherein the plane flies exclusively at subsonic speeds.

6. The window of claim 1, wherein the window comprises a pair of substantially similar panes disposed in a parallel, spaced-apart relationship defining a volume therebetween.

7. The window of claim 6, wherein the pressure in the volume between the panes is substantially less than a pressure outside of the window.

8. The window of claim 4, further comprising a bezel circumscribing the at least one pane and sealingly coupling the pane in the sidewall of the fuselage of the plane.

9. The window of claim 4, wherein the fuselage of the plane comprises a composite material.

10. The window of claim 1, wherein the at least one pane comprises glass or a polymer.

11. A subsonic passenger aircraft, comprising:
an elongated fuselage having opposite sidewalls and longerons; and,
a row of spaced-apart passenger windows mounted in each of the opposite sidewalls of the fuselage, each window comprising at least one substantially transparent window pane defining an ellipse having an eccentricity of at least about 0.87 and a transparent area of at least about 140 square inches.

12. The aircraft of claim 11, wherein:
the ellipse has a major axis and a minor axis,
the major axis has a length about twice the length of the minor axis, and
the minor axis is disposed generally perpendicular to a longeron of the fuselage.

13. The aircraft of claim 11, wherein:
the major axis about 20 inches long; and,
the minor axis is about 8 inches long.

14. The aircraft of claim 11, wherein the window comprises at least one inboard pane and at least one substantially similar outboard pane disposed in a parallel, spaced-apart relationship with the inboard pane and defining a volume between the two panes; and,
a bezel circumscribing the inboard and outboard panes and sealingly coupling edges of the panes to the fuselage of the aircraft.

15. The aircraft of claim 14, wherein the pressure in the volume between the panes is substantially less than a pressure surrounding the window.

16. The aircraft of claim 11, wherein the windows of each row are spaced apart by about 25 in.

17. A method of maximizing the area of the passenger windows of a subsonic passenger plane while minimizing the amount of exterior noise transmitted through the windows to the interior cabin space of the plane during flight, the method comprising:
providing a plurality of individual windows, each comprising at least one substantially transparent window pane in the shape of an ellipse, the ellipse having an eccentricity of from about 0.87 to about 0.91, a major axis and a minor axis, and wherein the major axis is disposed generally perpendicular to a long axis of the plane.

18. The method of claim 17, wherein providing the windows comprises:
providing a pair of similarly shaped, optically transparent window panes;
disposing the panes in a parallel, spaced-apart relationship that defines a volume between the panes; and,
sealingly coupling edges of the panes to a fuselage of the plane.

19. The method of claim 18, wherein sealingly coupling the edges of the window panes comprises:
circumscribing the edges of the panes with a bezel; and,
sealingly coupling the bezel to the fuselage of the plane.

20. The method of claim 18, further comprising reducing the pressure within the volume between the panes relative to a pressure outside of the panes.

* * * * *